Patented Dec. 21, 1948

2,456,742

UNITED STATES PATENT OFFICE 2,456,742

SEPARATION OF ISOMERS OF AMINO ACIDS

Anthony C. Shabica, Rahway, N. J., assignor to Merck & Co., Inc., Rahway, N. J., a corporation of New Jersey No Drawing. Application January 10, 1947, Serial No. 721,451

11 Claims. (Cl. 260—534)

This invention relates to an improved method for the isolation and separation of the stereoisomers dl-iso-leucine and dl-allo-isoleucine. This invention is particularly concerned with the preparation of sodium salts of isoleucine and the subsequent separation of isomers.

It has been proposed to isolate the dl-isoleucine, an essential amino acid, from mixtures containing both dl-isoleucine and dl-allo-isoleucine by fractionate crystallization from aqueous solutions. The crystallization is usually repeated several times in order to isolate the isomer in a pure state. This method is time absorbing and not capable of producing satisfactory yields due to large losses of material involved in each crystallization.

In accordance with my improved method the separation of the sodium salts of the isomers can be carried out in one operation.

I have found that the sodium salts of dl-isoleucine and dl-allo-isoleucine are formed when a mixture of the isomers is subjected to the action of alcoholic solutions of sodium, or sodium hydroxide. The sodium salts of the isomers possess different physical properties in that the sodium salt of dl-isoleucine is not soluble in alcoholic solutions of sodium, while the dl-allo-isoleucine isomer may be dissolved in such solutions.

Based on this clear distinction it is possible to separate the two isomers from each other in accordance with the method described hereinafter. Remarkably high yields may be obtained even if the content of the dl-isoleucine isomer is as low as 60%. Commercially available alcohols, such as ethyl alcohol, isopropyl alcohol and the like, may be used for the separation of the isomers.

The isolated, alcohol-insoluble sodium salt of dl-isoleucine, is soluble in water; the pure dl-isoleucine may be recovered from aqueous solution by acidification with glacial acetic acid.

The following examples illustrate methods of carrying out the present invention, but it is to be understood that these examples are given by way of illustration and not of limitation.

Example 1

13.11 g. of a mixture composed of 85% dl-isoleucine and 15% dl-allo-isoleucine was dissolved in a hot alcoholic solution of sodium ethylate (2.3 g. sodium 27 cc. of ethanol) contained in a 50 cc. flask. The mixture was refluxed for 30 minutes and then allowed to stand in the refrigerator for 16 hours. The sodium salt of dl-isoleucine, a white crystalline precipitate, was filtered, washed in 5 cc. of cold ethanol and dried at 50° C.

The sodium salt was decomposed by dissolving 5.0 g. in 15 cc. of water, decolorizing, acidifying with 1.9 cc. of glacial acetic acid and diluting with 30 cc. of hot ethanol. The mixture was cooled overnight in the refrigerator, filtered, washed with 90% ethanol and dried at 55° C. A small amount of ash, 0.16% was removed by dissolving 3.28 g. in 52 cc. of boiling water, filtering and diluting with 52 cc. of hot ethanol.

Microbial assay, 102% dl-isoleucine.

Purity by phase rule solubility, 99.6%.

Example 2

To a hot sodium isopropylate solution (2.3 g. of sodium in 39.3 cc. of isopropanol), contained in a 100 cc. round bottom flask, was added a mixture of dl-isoleucine and dl-allo-isoleucine (85% dl-isoleucine). The mixture was refluxed for 2 hours then permitted to stand at room temperature for 16 hours. The white, crystalline product was filtered, washed with 15 cc. of isopropanol and dried at 50° C. Yield 14.49 g., 94.6% of theory.

The sodium salt was decomposed in the manner described above.

Microbial assay, 102% dl-isoleucine.

Purity by phase rule solubility, 98.5%.

Modifications may be made in carrying out my present invention without departing from the spirit and scope thereof and the invention is to be limited only by the appended claims.

I claim:

1. The process for the separation of dl-isoleucine in the form of the sodium salt from mixtures of dl-isoleucine and dl-allo-isoleucine, which comprises reacting said mixture with a hot solution of a substance selected from the group which consists of sodium and sodium hydroxide in a lower aliphatic alcohol, cooling the reaction mixture and removing the precipitated sodium salt of dl-isoleucine.

2. The process for the separation of dl-isoleucine in the form of the sodium salt from mixtures of dl-isoleucine and dl-allo-isoleucine, which comprises reacting said mixture with a hot solution of sodium, in a lower aliphatic alcohol cooling the reaction mixture and removing the precipitated sodium salt of dl-isoleucine.

3. The process for the separation of dl-isoleucine in the form of the sodium salt from mixtures of dl-isoleucine and dl-allo-isoleucine, which comprises reacting said mixture with a hot solution of sodium hydroxide in a lower aliphatic alcohol, cooling the reaction mixture and removing the precipitated sodium salt of dl-isoleucine.

4. The process for the separation of dl-isoleucine in the form of the sodium salt from mixtures of dl-isoleucine and dl-allo-isoleucine, which comprises reacting said mixture with a hot solution of sodium in ethyl alcohol, cooling the reaction mixture and removing the precipitated sodium salt of dl-isoleucine.

5. The process for the separation of dl-isoleucine in the form of the sodium salt from mixtures of dl-isoleucine and dl-allo-isoleucine, which comprises reacting said mixture with a hot solution of sodium in isopropyl alcohol, cooling the reaction mixture and removing the precipitated sodium salt of dl-isoleucine.

6. The process for the separation of dl-isoleucine from mixtures containing substantially dl-isoleucine and dl-allo-isoleucine, which comprises treating said mixture with a hot solution of sodium in a lower aliphatic alcohol, cooling the reaction mixture, filtering off the precipitated sodium salt of dl-isoleucine and treating said sodium salt with glacial acetic acid.

7. The process for the separation of dl-isoleucine from mixtures containing substantially dl-isoleucine and dl-allo-isoleucine, which comprises treating said mixture with a hot solution of sodium hydroxide in a lower aliphatic alcohol, cooling the reaction mixture, filtering off the precipitated sodium salt of dl-isoleucine and treating said sodium salt with glacial acetic acid.

8. The process for the separation of dl-isoleucine from mixtures containing substantially dl-isoleucine and dl-allo-isoleucine, which comprises treating said mixture with a hot solution of sodium in ethyl alcohol, cooling the reaction mixture, filtering off the precipitated sodium salt of dl-isoleucine and thereafter treating said sodium salt with glacial acetic acid.

9. The process for the separation of dl-isoleucine from mixtures containing substantially dl-isoleucine and dl-allo-isoleucine, which comprises treating said mixture with a hot solution of sodium in isopropyl alcohol, cooling the reaction mixture, filtering off the precipitated sodium salt of dl-isoleucine and treating said sodium salt with glacial acetic acid.

10. The process for the separation of dl-isoleucine from mixtures containing substantially dl-isoleucine and dl-allo-isoleucine, which comprises treating said mixture with a hot alcoholic solution of sodium in a lower aliphatic alcohol, cooling the reaction mixture, filtering off the precipitated sodium salt of dl-isoleucine, dissolving said sodium salt in water and treating the aqueous solution with glacial acetic acid and alcohol.

11. The process for the separation of dl-isoleucine from mixtures of dl-isoleucine and dl-allo-isoleucine, which comprises treating said mixtures with a hot solution of a substance selected from the group consisting of sodium and sodium hydroxide in a lower aliphatic alcohol, cooling the reaction mixture, removing the precipitated sodium salt of dl-isoleucine, dissolving said salt in water and acidifying the aqueous solution to form dl-isoleucine.

ANTHONY C. SHABICA.

REFERENCES CITED

The following references are of record in the file of this patent:

UNITED STATES PATENTS

| Number | Name | Date |
|---|---|---|
| 2,004,523 | Fick | June 11, 1935 |
| 2,023,890 | Kuss et al. | Dec. 10, 1935 |
| 2,306,646 | Shildneck | Dec. 29, 1942 |
| 2,371,245 | Lee | March 13, 1945 |

FOREIGN PATENTS

| Number | Country | Date |
|---|---|---|
| 853,173 | France | Nov. 18, 1939 |

OTHER REFERENCES

Bouveault et al., "Bull. Soc. Chim., Paris," series 3, vol. 35 (1906), p. 968.

Ehrlich, Ber. Deut. Chem., vol. 41 (1908), pp. 1453 to 1458.